United States Patent [19]

Hatanaka

[11] Patent Number: 5,028,449

[45] Date of Patent: * Jul. 2, 1991

[54] PROCESS FOR THE PRODUCTION OF AN EGG LECITHIN

[76] Inventor: Hiroji H. Hatanaka, 285 Fifth St., Norco, Calif. 91760

[ * ] Notice: The portion of the term of this patent subsequent to Jul. 4, 2006 has been disclaimed.

[21] Appl. No.: 408,374

[22] Filed: Sep. 18, 1989

[51] Int. Cl.$^5$ .............................................. A23L 1/32
[52] U.S. Cl. .................................. 426/614; 426/478; 426/662
[58] Field of Search ................. 426/614, 98, 282, 520, 426/138, 417, 662, 478

[56] References Cited

U.S. PATENT DOCUMENTS

| | | | |
|---|---|---|---|
| 3,919,427 | 11/1975 | Vida et al. | 426/2 |
| 4,219,585 | 8/1980 | Herring | 426/614 |
| 4,844,926 | 7/1989 | Hatanaka | 426/614 |

*Primary Examiner*—Donald E. Czaja
*Assistant Examiner*—D. Workman
*Attorney, Agent, or Firm*—G. Donald Weber, Jr.

[57] ABSTRACT

The product is an egg oil which is extracted from dried eggs yolks, primarily, the yolks of chicken eggs and the method associated therewith to produce a high quality capsule of egg oil (lecithin).

2 Claims, 1 Drawing Sheet

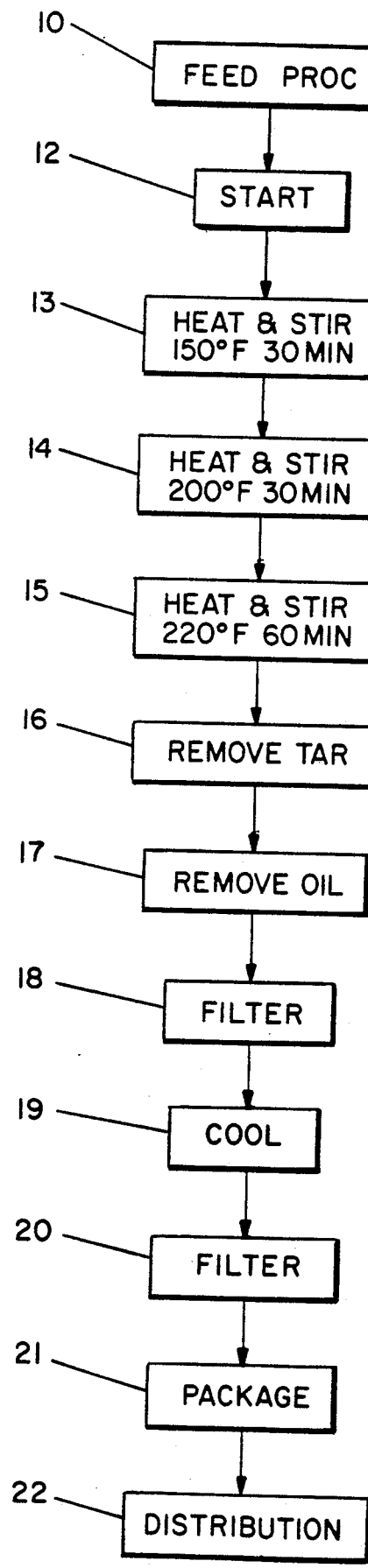

PROCESS FOR THE PRODUCTION OF AN EGG LECITHIN

BACKGROUND

1. Field of the Invention

This invention is directed to an egg oil (lecithin) product, in general, and to a high quality product which is believed to have health improving characteristics as well as an improved method of producing same from dried egg yolks, in particular.

2. Prior Art

Many centuries ago in Japan egg oil, or lecithin, was discovered and its use was considered to be a miraculous cure-all. It was believed to be the "number one" medicine for heart ailments, as well as physical rejuvenation. Its method of preparation was a closely guarded secret that was passed from person to person as a family secret. It was held in high esteem by the feuding Shoguns.

In more recent times, for example, during the period 1910 through 1925, doctors conducted clinical tests and treatments on cardiac patients utilizing egg oil (lecithin). The doctors reported the treatment to be a success and concluded that the family secret was in line with modern medicine and not an unfounded myth from the past.

The word "lecithin" is derived from the Greek word "lekithos" meaning egg yolk. As the name implies, lecithin is extracted from whole egg yolks and contains such nutrients as vitamins A, B1, B2, E and D; minerals including calcium, iron and phosphorous; and compounds including taurine and methionine. Its use as a dietary supplement is reported to confer the following health benefits:

1. Improves brain and nerve function. In addition to egg yolks, lecithin, is found in brain and nerve tissue and is reported to be a factor in retarding premature aging and senility.

2. Body rejuvenation. Lecithin, smooths and tones the skin and improves internal functions and sexuality (Vitamin E). It may also be useful in treating of burns on the skin.

3. Improves blood circulation. Contains such essential substances as linoleic, oleic and linolenic acids which are reportedly factors in improvement and/or prevention of such conditions as arteriosclerosis and hypertension.

Many people have concerns about eggs and cholesterol. Generally, it has been learned that eggs are a food that will not necessarily raise cholesterol. That is, there are two kinds of cholesterol, viz. HDL and LDL cholesterol. LDL cholesterol is the type which attaches to blood vessel walls. However, eggs contain HDL cholesterol which will disintegrate the LDL cholesterol and lecithin, thereby allowing the body to eliminate this material as waste, thus cleansing the blood.

Most of the foregoing benefits listed are treated in Dr. Mutsuo Yamaguchi's publication "TAMAGO ABURA NO KOYO" ("VIRTUES OF EGG OIL LECITHIN") reference to which is made for further particulars. This discussion was published by Kenji Fukushima and Health Kenkyusho Company in 1985.

PRIOR ART STATEMENT

The most pertinent prior art known to Applicant is:

N. Herring; U.S. Pat. No. 4,219,585; Process For Extracting Oil From Egg Yolks. This patent is directed to a method of treating hard boiled egg yolks produce a medically pure egg oil product which is externally applied to burned portions of the human body.

CO-PENDING APPLICATION

Reference is made to the co-pending application of H. H. Hatanaka entitled EGG LECITHIN PRODUCT AND PROCESS, Ser. No. 07/058,583, now U.S. Pat. No. 4,844,926 which relates to another process for extracting oil from egg yolks to produce a product similar to the product described herein.

SUMMARY OF THE INVENTION

A pure natural food product is made by processing of eggs, notably, chicken eggs. In particular, the processing includes the rendering, reducing, and treating of egg products, especially egg yolks, in order to produce the product. In one embodiment, the product is named "GOSHIN BODY GUARD" (or GOSHIN). This product is fabricated by using a unique method of processing the egg lecithin in order to provide the best quality product at the lowest price.

The process is a specially developed process which is believed to provide the maximum return of product based upon the input ingredients. In addition, the process described herein is believed to be the most effective and efficient process, to date, in producing the high quality, high yield product.

The product, as produced by the process, is enhanced by using dried egg yolks in order to enhance the quality of the egg lecithin obtained and the speed with which it is produced.

The ultimate product is combined, in a conventional fashion, with a gelatin-type capsule for easy ingestion. Other types of packaging are contemplated, as well.

BRIEF DESCRIPTION OF THE DRAWINGS

The sole FIGURE is a block diagram of the process utilized in the instant invention.

DESCRIPTION OF PREFERRED EMBODIMENT

Referring now to the sole FIGURE, there is shown a flow chart representative of the process involved in the instant invention.

Inasmuch as the process relates to a product made from eggs, typically but not limited to, chicken eggs, the process can be considered to begin with the provision of appropriate or preferred feed to the fowl which provide the eggs. The feed process 10 can be important insofar as controlling the quality and quantity of lecithin in the egg produced by the fowl. In the instant application, as in the prior application of H. H. Hatanaka, a proprietary feed product is supplied. This feed product is, in fact, a trade secret of and belonging to the inventor. Suffice it to say that, within certain natural limitations, so long as the fowl are fed, they will produce eggs. By controlling the feeding process, the quality and quantity of eggs and, thus, the by-product described herein can be enhanced.

In the instant invention, however, the eggs have been treated and only dried egg yolks are utilized. The process of obtaining and drying the egg yolks is not part of the invention, per se.

The start stage 12 is representative of the placing of the dried egg yolks into a suitable vessel for operation thereon. In particular, a stainless steel cooking vessel is used. In the basic or rudimentary arrangement, the vessel is an open pan (not shown). However, in other operations a closed vessel or even a pressurized vessel can be utilized advantageously to retain the desirable characteristics of the product and/or to speed the operation of the process.

At step 13, the dried egg yolks are heated to 150° F. for thirty (30) minutes. The yolk mixture is constantly stirred at this time to produce a soft scrambled egg consistency. The mixture takes on a brownish hue and thickens into a relatively soft, adhering consistency. By mixing and stirring the mixture, the consistency thereof is maintained throughout.

At stage 14, heat is applied so that the mixture is heated to 200° F. for thirty (30) minutes. Again, the mixture is stirred constantly in order to maintain consistency throughout. At this time the mixture turns dark brown, has a lumpy texture and has begun to foam. The foaming is believed to be the effect of driving off additional moisture in the product.

In stage 15, the temperature is raised to 220° F. and is maintained for about sixty (60) minutes. This operation ha the effect of splitting the product into the oil and solid components thereof. The oil flows and pools at the bottom of the vessel. The solid component has the appearance of a tar or a tar-like material, which, essentially, floats on the surface of the oil component.

At stage 16, the tar-like material in the form of a black mass is removed from the process and discarded.

At stage 17, the oil component of the product is removed from the elevated temperature and is permitted to cool to a temperature which is suitable for handling the product.

At stage 18, the liquid or oil is filtered in the first filtration process through a stainless steel screen into a stainless steel container. This filtered liquid product is stored at 55° F. to 60° F. for about twelve (12) hours.

By stage 19 the liquid product is cool enough for further filtration to remove any remaining residue therefrom. The product is, typically, filtered three (3) times through mesh cloth, then transferred to a plastic container for shipment to the encapsulation operation shown at stage 21. This packaging can be in the form of tablets, capsules, or, in the preferred embodiment, a gelatin-type ampule. The packaging can then proceed in terms of boxes, vials, or the like. From the packaging stage, the product is then distributed in the distribution stage 22 in the usual manner.

In an alternative process, about one half ($\frac{1}{2}$) cup of the product developed after stage 17 is added to about ten (10) pounds of the dry yolk material. This operation tends to increase the effectiveness of the process. In this case, the entire process is speeded up by approximately one-half hour overall.

In one test, ten (10) pounds of dried egg yolks were used at the onset. When this product was run through the process, a finished liquid product of approximately 10 ounces was obtained.

Thus, there is shown and described a process for producing an egg-based product comprising largely egg lecithin. The process which is shown and described is a preferred embodiment and is believed to be appropriate. The recommended usage of the product as a dietary supplement is one (1) capsule after breakfast and two (2) capsules at evening meals. However, other dosages can be used by persons with different physiological make-ups as their conditions indicate. After continued use of this product for at least 3 to 4 months, it is generally reported that a person will feel a difference in himself and his well-being.

GOSHIN is a pure natural food and should not cause any undesirable side effects. The hens which produce the eggs from which the yolks are extracted are fed a specially formulated feed to enhance the quality of the egg lecithin. In one informal test, it has been found that after using "GOSHIN" now for more than a year, blood pressure and cholesterol are reduced; hair color is returned to nearly its natural color; constipation has been relieved; the test subjects have more energy; and because of skin becoming smoother, look younger. Of course, the benefits may vary from user to user and are not to be considered as guaranteed under this description. Also, the guidance and supervision of a physician is always recommended.

This description recites a preferred embodiment of the invention. It is contemplated that modifications to this process may be suggested to those skilled in the art. However, any such modifications which fall within the purview of this description are intended to be included therein as well. This description is intended to be illustrative only and is not intended to be limitative. Rather, the scope of the invention is limited only by the claims appended hereto.

I claim:

1. The process of making an egg-based product adapted for internal consumption by humans comprising the steps of:

providing a separated and pre-dried yolk portion of an egg;

heating the separated and dried yolk portion of an egg in a plurality of steps each of which is characterized by time and temperature limits to remove substantially all of the moisture therefrom and to produce an oil which is retained as the egg-based product;

said plurality of steps include:

a first heating step wherein the dried yolk portion is heated to about 150° F. for about 30 minutes while being lightly stirred;

a second heating step wherein the dried yolk portion is heated to about 200° F. for about 30 minutes while being lightly stirred;

a third heating step wherein the dried yolk portion is heated to about 220° F. for about 60 minutes;

a filtering step wherein the heated yolk portion is passed through at least one filtration means after said third heating steps; and a cooling step wherein the heated yolk portion is cooled to approximately room temperature after said filter step.

2. The process recited in claim 1 including, a plurality of filter steps wherein the separated and dried yolk portion is passed through at least one filtration means after each of said heating steps.

* * * * *